US012584528B2

(12) United States Patent
Boffelli et al.

(10) Patent No.: US 12,584,528 B2
(45) Date of Patent: Mar. 24, 2026

(54) BRAKE ASSEMBLY

(71) Applicant: Westinghouse Air Brake Technologies Corporation, Pittsburgh, PA (US)

(72) Inventors: Roberto Boffelli, Camisano (IT); José Manuel Saraiva Carvalho, Cologne (DE)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 301 days.

(21) Appl. No.: 17/347,356

(22) Filed: Jun. 14, 2021

(65) Prior Publication Data

US 2021/0396288 A1 Dec. 23, 2021

Related U.S. Application Data

(60) Provisional application No. 63/041,470, filed on Jun. 19, 2020.

(51) Int. Cl.
F16D 65/12 (2006.01)
F16D 65/02 (2006.01)
(52) U.S. Cl.
CPC .... F16D 65/124 (2013.01); F16D 2065/1392 (2013.01)
(58) Field of Classification Search
CPC ........... F16D 65/124; F16D 2065/1328; F16D 65/123; F16D 2065/1392; F16D 2055/007; F16D 2065/1348; F16D 2065/1396
See application file for complete search history.

(56) References Cited

U.S. PATENT DOCUMENTS 1,765,477 A * 6/1930 Ackerman .......... B60B 17/0017
74/574.2
2,352,223 A * 6/1944 Trainer ................. F16D 65/124
188/218 R
(Continued)

FOREIGN PATENT DOCUMENTS

AU     4175578 A     5/1980
CN     203431075 U     2/2014
DE     19617154 A1     11/1997

OTHER PUBLICATIONS

DE 19617154 C2 (Year: 2000).*
(Continued)

*Primary Examiner* — Robert A. Siconolfi
*Assistant Examiner* — Mahbubur Rashid
(74) *Attorney, Agent, or Firm* — K&L Gates LLP

(57) ABSTRACT

A brake assembly is provided that may include a first friction ring having a plurality of mounting assemblies spaced around the first friction ring and configured to secure the first friction ring to a web of a wheel. At least one of the plurality of mounting assemblies of the first friction ring may include a first arcuate body surrounding a first opening. The brake assembly may also include a second friction ring having a plurality of mounting assemblies spaced around the second friction ring and configured to secure the second friction ring to the web of the wheel. The brake assembly may also include a flexible fastener disposed through the first opening and second opening and configured to be disposed through the web of the wheel to secure the web of the wheel between the first arcuate body and the second arcuate body.

4 Claims, 3 Drawing Sheets

(56) References Cited

U.S. PATENT DOCUMENTS

| | | | | | |
|---|---|---|---|---|---|
| 2,646,308 | A | * | 7/1953 | Boschi | B60B 17/0041 |
| | | | | | 152/41 |
| 3,530,960 | A | * | 9/1970 | Gronemann | F16D 65/124 |
| | | | | | 188/218 XL |
| 3,877,551 | A | * | 4/1975 | Gebhardt | F16D 65/124 |
| | | | | | 188/218 XL |
| 3,939,946 | A | * | 2/1976 | Pierre | F16D 65/124 |
| | | | | | 188/218 XL |
| 4,018,311 | A | * | 4/1977 | Tickle | F16D 65/124 |
| | | | | | 188/218 XL |
| 4,199,044 | A | * | 4/1980 | Ivens | B61H 5/00 |
| | | | | | 188/218 XL |
| 4,635,990 | A | * | 1/1987 | Golubenko | B60B 17/0041 |
| | | | | | 152/48 |
| 4,679,665 | A | * | 7/1987 | Smith | F16D 65/124 |
| | | | | | 188/218 XL |
| 5,010,985 | A | * | 4/1991 | Russell | F16D 65/124 |
| | | | | | 188/218 XL |
| 5,379,869 | A | * | 1/1995 | Fox | F16D 65/124 |
| | | | | | 188/218 XL |
| 7,625,030 | B2 | * | 12/2009 | Bieker | B60B 17/0006 |
| | | | | | 301/6.91 |
| 8,939,488 | B2 | * | 1/2015 | Wirth | F16D 65/124 |
| | | | | | 295/1 |
| 9,523,401 | B2 | * | 12/2016 | Iwahashi | B60B 31/06 |
| 9,562,577 | B2 | * | 2/2017 | Wirth | F16D 65/12 |
| 9,587,690 | B2 | * | 3/2017 | Boffelli | F16D 65/847 |
| 9,669,849 | B2 | * | 6/2017 | Mosbach | F16D 65/124 |
| 9,691,642 | B2 | * | 6/2017 | Iwahashi | B08B 3/04 |
| 10,012,278 | B2 | * | 7/2018 | Krause | B61H 11/00 |
| 2002/0166740 | A1 | * | 11/2002 | Zhang | F16D 65/847 |
| | | | | | 188/218 XL |
| 2006/0021542 | A1 | * | 2/2006 | Bieker | B60B 17/0031 |
| | | | | | 105/209 |
| 2010/0283276 | A1 | * | 11/2010 | Wirth | F16D 65/124 |
| | | | | | 295/7 |
| 2014/0352417 | A1 | * | 12/2014 | Iwahashi | B05B 15/80 |
| | | | | | 73/129 |
| 2015/0130202 | A1 | * | 5/2015 | Wirth | F16D 65/12 |
| | | | | | 295/30 |
| 2015/0232108 | A1 | * | 8/2015 | Mosbach | F16D 65/124 |
| | | | | | 188/218 XL |
| 2016/0186823 | A1 | * | 6/2016 | Krause | F16D 65/092 |
| | | | | | 188/218 XL |

OTHER PUBLICATIONS

AT 519892 B1 (Year: 2019).*
WO 2012160094 A2 (Year: 2012).*
WO 2014038621 A1 (Year: 2014).*
European Search Report received for related European Patent Application No. 21179726 dated Oct. 4, 2021 (2 pages).
First Examination Report received for related Australian Patent Application No. 2021203541 dated Jun. 15, 2022 (3 pages).
Search Report received for related European Patent Application No. 21179726.1 dated Aug. 26, 2022 (6 pages).
Office Action received for related EP App. No. 21179726.1 dated Jul. 28, 2023 (6 pages).

* cited by examiner

BRAKE ASSEMBLY

RELATED APPLICATIONS

This application claims priority to U.S. Provisional Application No. 63/041,470, filed on 19 Jun. 2020 and entitled "Brake Assembly", the entire disclosure of which is incorporated by reference.

BACKGROUND

Technical Field

The subject matter described relates to a brake assembly for a vehicle.

Discussion of Art

Brake assemblies for vehicles are utilized for slowing and stopping the vehicle. In particular, with high speed vehicles typically disc pads are used to provide friction on the wheel or a portion of the wheel. For example, rail vehicles have a wheel and a wheel web, where typically first and second discs are located on opposite sides of the wheel web and are coupled together with the wheel web disposed therebetween. Over time, after many uses, brake discs begin to deform and wear. One of the reasons for wear is from the amount of heat that is generated at the discs when the braking operation occurs. Such heat leads to deformation, reduced performance, and reduced disc life. The deformations can be described as dynamic deformations, happening during the brake application, and permanent deformations, so visible after the cooling down of the brake discs, and resulting like a permanent shape deformation. Typical of this permanent deformation is referred to as coning. The dynamic deformations shall be normally limited because they generate a loss of the friction level due to the consequent worse interaction with the disc pads material. The permanent deformation generates maintenance issues such that when a wheel needs to be replaced, a braking assembly that is still operating appropriately cannot be reinstalled on a brand new wheel, because the interface is deformed. Consequently, when a wheel is replaced, the brake assembly must also be replaced, even though additional brake life exists, resulting in unneeded replacement costs.

BRIEF DESCRIPTION

In one or more embodiments, a friction ring for a brake assembly is provided that may include a first friction ring body, and a plurality of mounting assemblies spaced around the first friction ring body and configured to secure the first friction ring body to a web of a wheel. The at least one of the mounting assemblies may include an arcuate body surrounding an opening, and a flexible fastener unit disposed through the opening and configured to be disposed through the web of the wheel.

In one or more embodiments, a brake assembly is provided that may include a first friction ring having a plurality of mounting assemblies spaced around the first friction ring and configured to secure the first friction ring to a web of a wheel. At least one of the plurality of mounting assemblies of the first friction ring may include a first arcuate body surrounding a first opening. The brake assembly may also include a second friction ring having a plurality of mounting assemblies spaced around the second friction ring and configured to secure the second friction ring to the web of the wheel. The at least one of the plurality of mounting assemblies of the second friction ring may include a second arcuate body surrounding a second opening that corresponds to the first arcuate body and first opening. The brake assembly may also include a flexible fastener disposed through the first opening and second opening and configured to be disposed through the web of the wheel to secure the web of the wheel between the first arcuate body and the second arcuate body.

In one or more embodiments, a method of replacing a wheel of a rail vehicle is provided that may include removing a plurality of flexible fasteners that secure a web of a first wheel between a first friction ring and a second friction ring. The first friction ring may have a plurality of mounting assemblies spaced around the first friction ring and configured to secure the first friction ring to a web of a wheel, and at least one of the plurality of mounting assemblies of the first friction ring includes a first arcuate body surrounding a first opening. The second friction ring may have a plurality of mounting assemblies spaced around the second friction ring and configured to secure the second friction ring to the web of the first wheel, and at least one of the plurality of mounting assemblies of the second friction ring may include a second arcuate body surrounding a second opening that corresponds to the first arcuate body and first opening. The method may also include replacing the first wheel with a second wheel, and securing a web of the second wheel between the first friction ring and the second friction ring.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a brake assembly, or brake discs, for a vehicle that couples to the web of a wheel such that upon removal of the wheel, the brake assembly may be reused for the replacement wheel. To accomplish, the friction ring of the brake assembly includes a friction ring body with mounting assemblies having an arcuate body surrounding an opening that receives a flexible fastener unit for coupling the web of the wheel between the friction ring and a second friction ring. By having an arcuate shape, the arcuate shaped body reduces heat conveyed between the web and the friction ring reducing thermal wear, while the flexible fastener unit allows deformation to occur, without the brake assembly integrating with the web of the wheel. As a result, when replacement of a wheel is desired, the brake assembly may be reused.

Figures 1, 2:
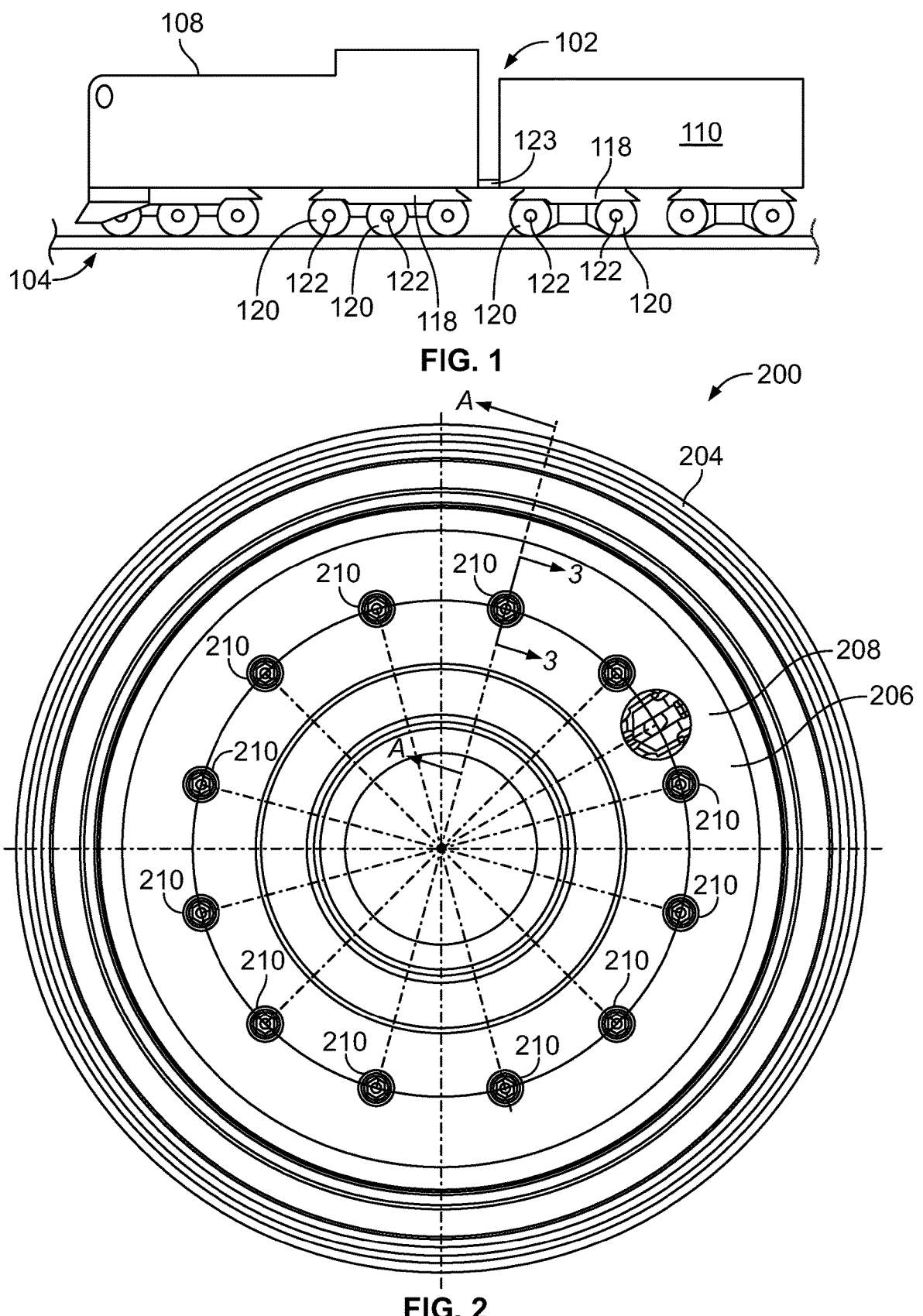
FIG. 1 illustrates a schematic diagram of a vehicle system.
FIG. 2 illustrates a top plan view of a brake assembly.

FIG. 1 illustrates a schematic diagram of a vehicle system 102 that may utilize a brake assembly as described herein (FIG. 2). In one example, the vehicle system may be a very high speed (VHS) rail vehicle, including rail vehicles utilized for carrying passengers. The vehicle system may be configured to travel along a route 104 on a trip from a starting or departure location to a destination or arrival location. The route may be a road, track, rail, air space, water space, etc. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. In one example, the single vehicle may be a truck or an off-road vehicle.

The propulsion-generating vehicle may be configured to generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle may be referred to herein as a propulsion vehicle, and the non-propulsion-generating vehicle may be referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle. In one example, one of the propulsion vehicles may be a lead vehicle in a multi-vehicle system, where other vehicles are remote vehicles of the multi-vehicle system. In particular, the remote vehicles may be propulsion generating vehicles or non-propulsion generating vehicles.

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 1, the vehicles of the vehicle system each include multiple wheels 120 that engage the route and at least one axle 122 that couples left and right wheels together (only the left wheels are shown in FIG. 1). Each wheel may include a brake assembly (not illustrated) that couples to a wheel web (not illustrated) for slowing or stopping the vehicle and/or vehicle system. Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 123. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system.

Figure 3:
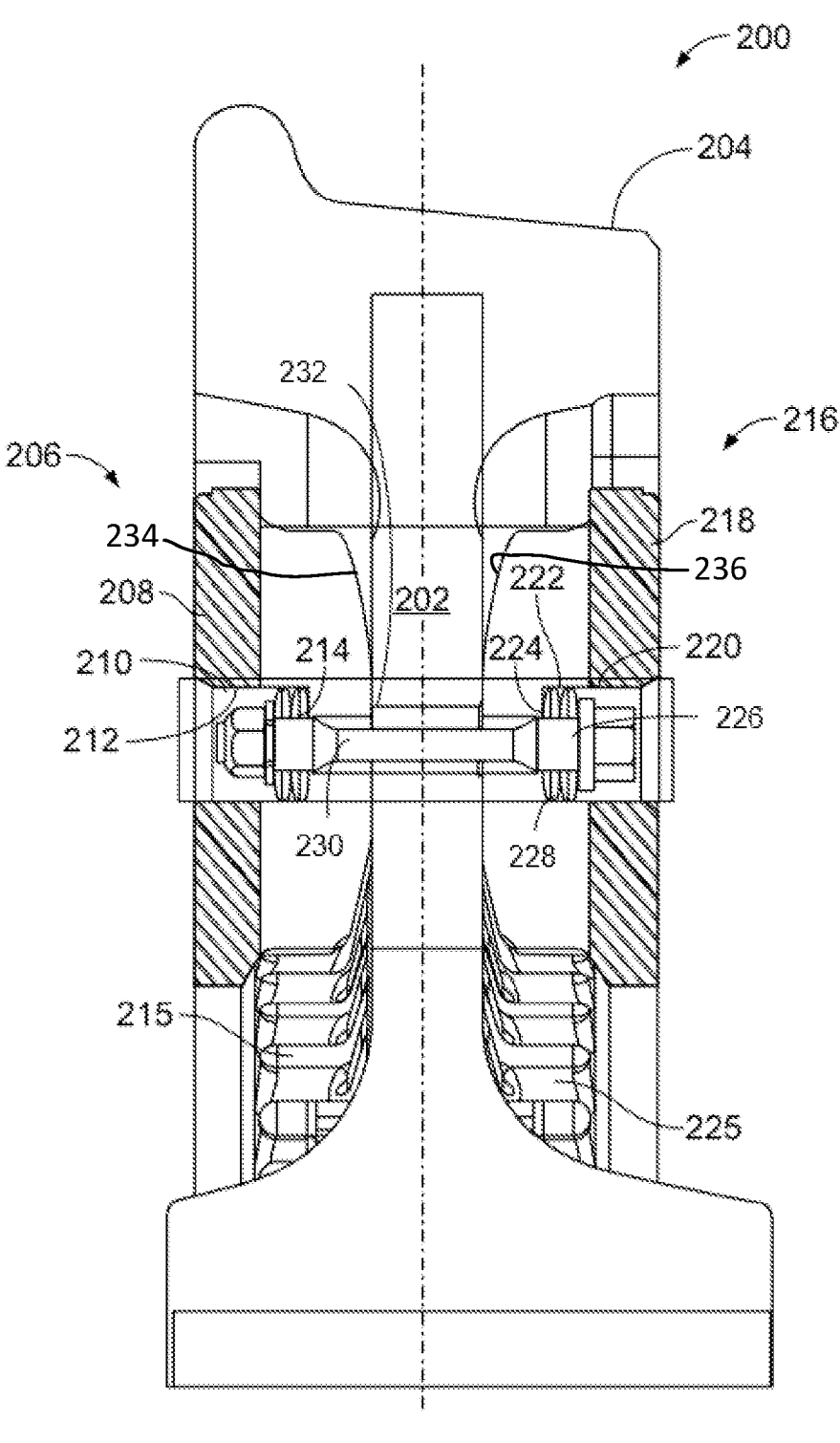
FIG. 3 illustrates a sectional view of a friction ring of a brake assembly taken along lines 3-3 of FIG. 2.

FIG. 2 illustrates a top plan view and FIG. 3 illustrates a sectional view taken along lines 3-3 of a brake assembly 200 that is coupled to a web 202 of a wheel 204 of a vehicle. In one example, the vehicle is the vehicle system of FIG. 1. FIG. 3 only illustrates a portion of the brake assembly, and specifically, one mounting point between the brake assembly and the web.

The brake assembly includes a first friction ring 206 that has a friction ring body 208 that includes a plurality of first mounting assemblies 210. The radius of the first friction ring body may vary based on the application, and may be in a range between 500 mm and 1200 mm (19.7 in and 47.2 inches), depending on the size of the brake disc to be used. In particular, the size is proportional to the thermal stress coming from the application. The first friction ring (and second friction ring) may be formed through machining, molding, additive processes, or the like, and may be formed from steel, cast iron, etc.

With reference to FIG. 3, only a single mounting assembly is illustrated; however, the friction ring body includes plural mounting assemblies positioned around the friction ring body (as illustrated in FIG. 2). In one example, only eight mounting assemblies are provided. Alternatively, less the eight mounting assemblies, or more than eight mounting assemblies may be provided. For example, twelve mounting assemblies may be provided.

The illustrated first mounting assembly includes a first arcuate body 212 that defines a first opening 214 therethrough. The first arcuate body may be cylindrical, frustro-conical with a first end having a greater diameter than a second end, or the like. In one example, each of the first mounting assemblies includes a first arcuate body. In one example, the thickness of the first arcuate body is between 40 mm and 47 mm, with the brake assembly including the wheel, and the first and second friction rings being in a range between 125 mm and 140 mm (4.9 in. and 5.5 in). The first arcuate body includes an arcuate surface 234 that surrounds the first opening. When the first friction ring is installed on the wheel, a portion of the arcuate surface is in contact with the wheel web. The arcuate surface allows the first friction ring to freely conically deform without affecting the interaction and functionality of the mounting assemblies.

Alternatively, at least one of the first mounting assemblies includes a first arcuate body, whereas another first mounting assembly includes a chamfered body. In particular, a chamfered body is a body formed from a cut away edge that makes a sloped surface. The chamfered body provides a minimum gap with the wheel web surface to provide a maximum cooling effect for the friction ring body. In one example, the chamfer is formed with at least a 10° machining.

Spaced from each first arcuate body are plural first radial fin elements 215. The plural radial first fin elements are radially positioned about the first friction ring body between the first mounting assemblies. Specifically, coning, or deformation of up to 5 mm (0.2 in) may occur such that the space between the first radial fins and the web when the brake assembly is brand new should be at least 2 mm (0.08 in). The radius of the first mounting assembly is centered in the first opening, tangent to the ideal flat surface, and then covering the complete first radial fins extension. Over a limit, when the distance between the first radial fins and the wheel web is enough, the radius can be replaced by a standard chamfer to arrive to the end of the raw fins.

Juxtaposed on the other side of the web is a second friction ring 216. The second friction ring may include a second friction ring body 218 having second mounting assemblies 220. At least some of the second mounting assemblies have second arcuate bodies 222 that define second openings 224 therethrough. The second friction ring may be substantially similar to the first friction ring. The second arcuate body may be cylindrical, frustroconical with a first end having a greater diameter than a second end, or the like. The second arcuate body includes an arcuate surface 236 that surrounds the second opening. When installed on the wheel, a portion of the arcuate surface of the second arcuate body is in contact with the wheel web. The arcuate surface of the second arcuate body allows the second friction ring to conically deform. In one example, each of the second mounting assemblies includes a second arcuate body. Alternatively, at least one of the second mounting assemblies includes a second arcuate body, whereas another second mounting assembly includes a chamfered body. Spaced from each second mounting assembly are plural second radial fin elements 225. The plural second radial fin elements are radially positioned about the second friction ring body between the second mounting assemblies.

The second friction ring corresponds with the first friction ring in that each first mounting assembly corresponds with a corresponding second mounting assembly to align each of the first openings with the second openings. In this manner, a flexible fastener unit 226 may be disposed through each of the first and second openings and web to secure the web between the first friction ring and second fiction ring.

The flexible fastener unit may be a screw, belt, etc. that couples the web between the first friction ring and second friction ring. Each flexible fastener unit includes elastic elements 228 and a fastener body 230. The fastener body may be a screw, bolt, etc. In one example, the elastic elements may surround the fastener body. The elastic elements may be flexible pads. The elastic elements allow for deformation of the flexible fastener unit without the fastener body becoming integrated with the web. In this manner, if the wheel of the vehicle is replaced, the brake assembly may be separated from a first wheel being replaced and then secured to the second replacement wheel for continued use. By allowing the brake assembly to be separated and reused, the cost of replacing the brake assembly every time a wheel is replaced, is reduced. The flexible fastener unit may also include sliding pins 232 that may be integrated within the first arcuate body and second arcuate body and disposed through the web of the wheel. In one example, the sliding pins are generally movable blocks of the flexible fastener unit.

Figure 4:
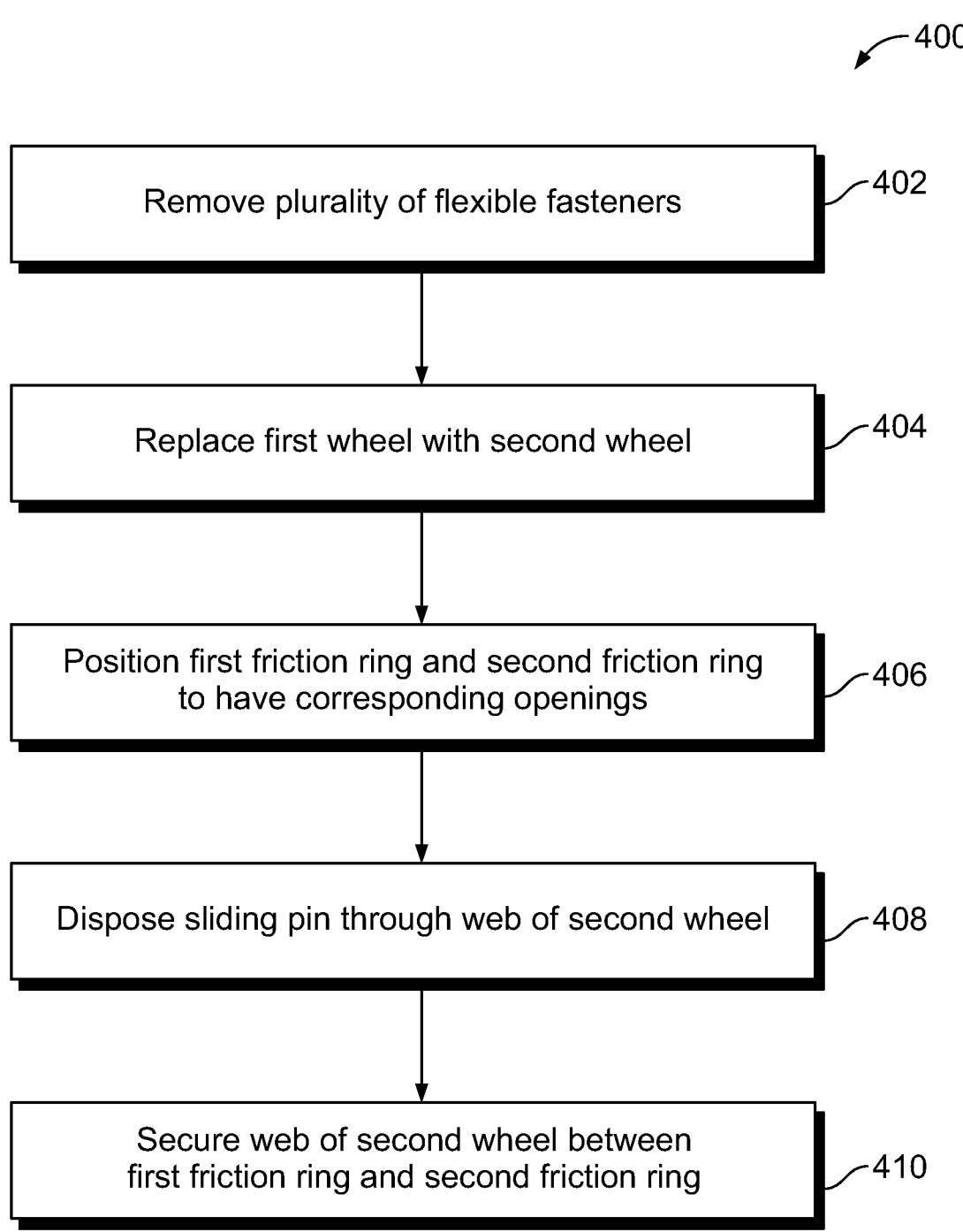
FIG. 4 illustrates a method of replacing a wheel of a vehicle.

FIG. 4 illustrates a method 400 of replacing a wheel of a rail vehicle. The wheel may be the wheel of FIGS. 1-3. At 402, a plurality of flexible fasteners that secure a web of a first wheel between a first friction ring and a second friction ring are removed. The first friction ring may be the first friction ring as described in relation to FIGS. 2-3. Specifically, the first friction ring may have a plurality of mounting assemblies spaced around the first friction ring and be configured to secure the first friction ring to a web of a wheel, and at least one of the plurality of mounting assemblies of the first friction ring may include a first arcuate body surrounding a first opening. The second friction ring similarly may be a second friction ring as described in relation to FIG. 2. Specifically, the second friction ring may have a plurality of mounting assemblies spaced around the second friction ring and be configured to secure the second friction ring to the web of the first wheel. At least one of the plurality of mounting assemblies of the second friction ring may include a second arcuate body surrounding a second opening that corresponds to the first arcuate body and first opening.

At 404, the first wheel is replaced with a second wheel. The second wheel may be substantially similar to the first wheel, including being of similar size and shape and including a web. At 406, the first friction ring and second friction ring are positioned on opposite sides of the web such that openings in mounting assemblies of each friction ring correspond to one another. At 408, a sliding pin is disposed through the web of the second wheel. In this manner, the flexible fastener may be inserted accordingly.

At 410, the web of the second wheel is secured between the first friction ring and the second friction ring. Specifically, a flexible fastener unit may be utilized to compress the web of the second wheel between the first friction ring and second friction ring. In particular, because of the flexibility of the fastener, deformation does not result in the integration of the brake assembly with the first wheel, allowing for replacement of the first wheel with the second wheel while still using the same brake assembly. In this manner, costs are saved because the brake assembly that still has usable life is not discarded and replaced.

In one or more embodiments, a friction ring for a brake assembly is provided that may include a first friction ring body, and a plurality of mounting assemblies spaced around the first friction ring body and configured to secure the first friction ring body to a web of a wheel. The at least one of the mounting assemblies may include an arcuate body surrounding an opening, and a flexible fastener unit disposed through the opening and configured to be disposed through the web of the wheel.

Optionally, the arcuate body is a cylinder that surrounds the opening. Alternatively, the arcuate body is a frustroconical shape that surrounds the opening. In one example, the arcuate body engages the web and is configured to allow the first friction ring body to deform conically. In one aspect, the at least one of the mounting assemblies may also include a sliding pin integrated within the arcuate body and configured to be disposed through the web of the wheel. In another aspect, the plurality of mounting assemblies may include only eight mounting assemblies spaced about the friction ring. In an example, the eight mounting assemblies may be spaced equidistance from one another.

Optionally, the friction ring may also include a radial fin spaced from the at least one of the mounting assemblies. In one aspect, at least one of the mounting assemblies may include a body having a chamfered end that is configured to couple to the web of the wheel. In another aspect, the flexible fastener may include at least one elastic element.

In one or more embodiments, a brake assembly is provided that may include a first friction ring having a plurality of mounting assemblies spaced around the first friction ring and configured to secure the first friction ring to a web of a wheel. At least one of the plurality of mounting assemblies of the first friction ring may include a first arcuate body surrounding a first opening. The brake assembly may also include a second friction ring having a plurality of mounting assemblies spaced around the second friction ring and configured to secure the second friction ring to the web of the wheel. The at least one of the plurality of mounting assemblies of the second friction ring may include a second arcuate body surrounding a second opening that corresponds to the first arcuate body and first opening. The brake assembly may also include a flexible fastener disposed through the first opening and second opening and configured to be disposed through the web of the wheel to secure the web of the wheel between the first arcuate body and the second arcuate body.

Optionally, at least one of the first arcuate body and the second arcuate body may be a cylinder or a frustroconical shape. In one aspect, the brake assembly may also include a sliding pin integrated within the first arcuate body and the second arcuate body, and configured to be disposed through the web of the wheel. In another aspect, the first friction ring may include at least one first radial fin spaced from the first arcuate body, and the second friction ring may include at least one second radial fin spaced from the second arcuate body.

Optionally, at least one of the mounting assemblies of the first friction ring may include a body having a chamfered end that is configured to couple to the web of the wheel. In one aspect, the flexible fastener may include at least one elastic element. In another aspect, the wheel may be configured to engage a rail. In one example, the first friction ring may not include a mounting assembly of the plurality of mounting assemblies that has a chamfered surface. In another example the first friction ring may be identical to the second friction ring.

In one or more embodiments, a method of replacing a wheel of a rail vehicle is provided that may include removing a plurality of flexible fasteners that secure a web of a first wheel between a first friction ring and a second friction ring. The first friction ring may have a plurality of mounting assemblies spaced around the first friction ring and configured to secure the first friction ring to a web of a wheel, and at least one of the plurality of mounting assemblies of the first friction ring includes a first arcuate body surrounding a first opening. The second friction ring may have a plurality of mounting assemblies spaced around the second friction ring and configured to secure the second friction ring to the web of the first wheel, and at least one of the plurality of mounting assemblies of the second friction ring may include a second arcuate body surrounding a second opening that corresponds to the first arcuate body and first opening. The method may also include replacing the first wheel with a second wheel, and securing a web of the second wheel between the first friction ring and the second friction ring.

Optionally, the method may also include disposing a sliding pin through the web of the second wheel before securing the web of the second wheel between the first friction ring and the second friction ring.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method of wheel replacement for a rail vehicle, the method comprising:

removing flexible fastener units that secure a web of a first wheel between a first friction ring and a second friction ring, the first friction ring having first mounting assemblies spaced around the first friction ring and configured to secure the first friction ring to the web of the first wheel, wherein at least one of the first mounting assemblies includes a first arcuate body defining a first opening therethrough, the first arcuate body including an arcuate surface surrounding the first opening and curved in an axial direction relative to the first wheel, the arcuate surface of the first arcuate body configured to contact the web of the first wheel, the second friction ring having second mounting assemblies spaced around the second friction ring and configured to secure the second friction ring to the web of the first wheel, wherein at least one of the second mounting assemblies includes a second arcuate body defining a second opening therethrough that corresponds to the first opening;

conically deforming the first friction ring;

replacing the first wheel with a second wheel after the first friction ring is conically deformed; and securing a web of the second wheel between the first friction ring and the second friction ring.

2. The method of claim 1, further comprising:

disposing a sliding pin through the web of the second wheel before securing the web of the second wheel between the first friction ring and the second friction ring.

3. The method of claim 1, further comprising:

deforming elastic elements of at least one of the flexible fastener units before replacing the first wheel with the second wheel.

4. The method of claim 3, wherein the elastic elements of the at least one flexible fastener unit are deformed without a fastener body of the at least one flexible fastener unit becoming integrated with the web of the first wheel.

*    *    *    *    *